United States Patent [19]

Freeman

[11] 4,274,463
[45] Jun. 23, 1981

[54] TIRE TRACTION ENHANCING APPARATUS

[76] Inventor: Marshall Freeman, 1305 Camino Pablo, San Jose, Calif. 95125

[21] Appl. No.: 88,020

[22] Filed: Oct. 25, 1979

[51] Int. Cl.³ .......................................... B60C 27/00
[52] U.S. Cl. ................................ 152/213 R; 152/223; 152/241
[58] Field of Search ........... 152/242, 241, 239, 213 R, 152/213 A, 223, 225 R, 233

[56] References Cited

U.S. PATENT DOCUMENTS

| | | | |
|---|---|---|---|
| 1,862,104 | 6/1932 | Weiss | 152/239 |
| 2,130,293 | 9/1938 | Bonforte | 152/242 |
| 2,608,234 | 8/1952 | Hughes | 152/213 R |
| 2,633,888 | 4/1953 | Vecchioni | 152/239 |
| 3,955,610 | 5/1976 | Freeman | 152/213 A |
| 4,093,021 | 6/1978 | Groom | 248/27.1 X |

*Primary Examiner*—William A. Powell
*Assistant Examiner*—Thomas Bokan
*Attorney, Agent, or Firm*—Thomas E. Schatzel

[57] ABSTRACT

A traction enhancing apparatus for attachment to vehicular tires having both circumferential and cross chain members engaging the tread of the tire and further including one or two semi-rigid "U-shaped" bridle members for gripping the tire sidewalls during installation while rotating away from the gripping position so as to be a part of the closure structure after installation of the apparatus on the tire.

6 Claims, 6 Drawing Figures

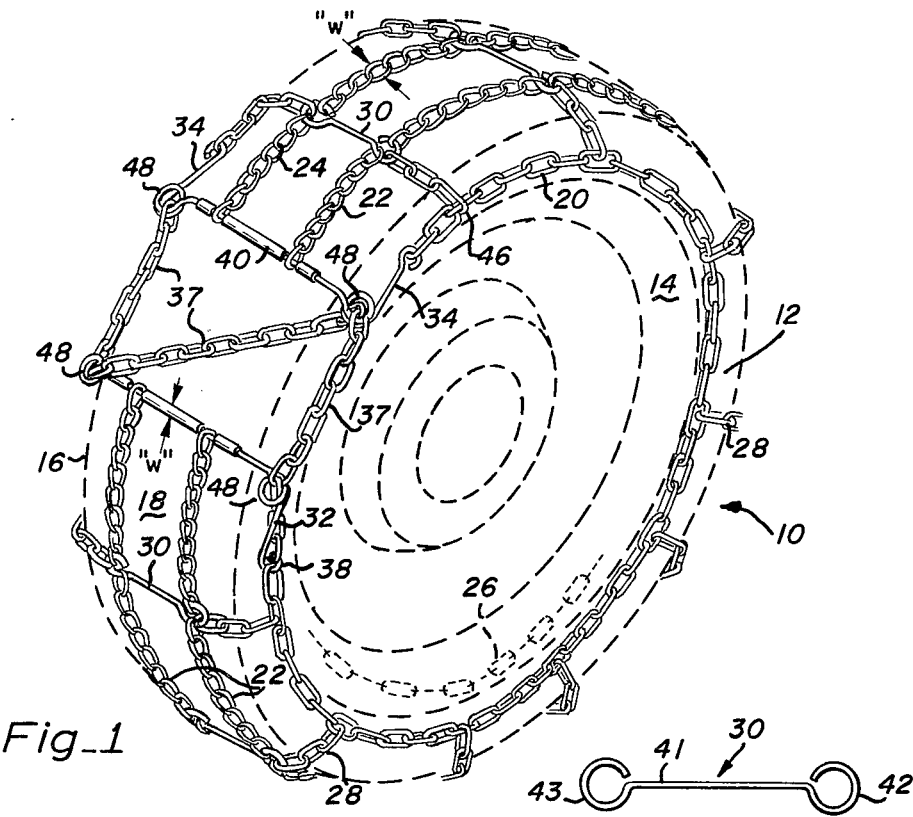
Fig_1
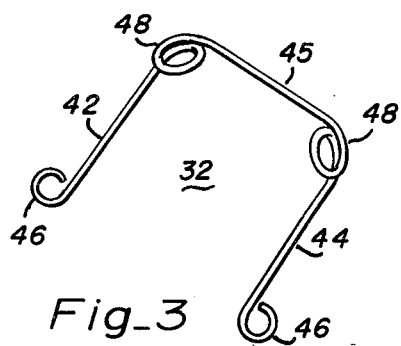
Fig_3
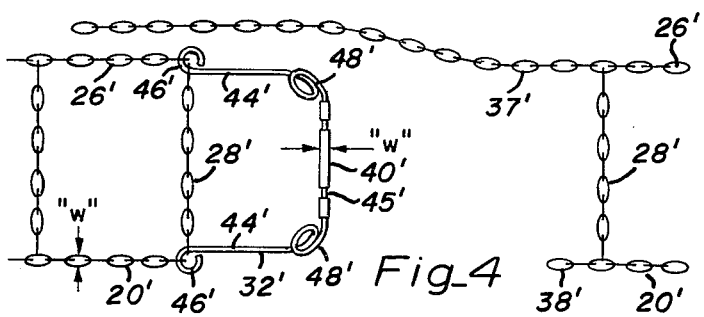
Fig_2
Fig_4
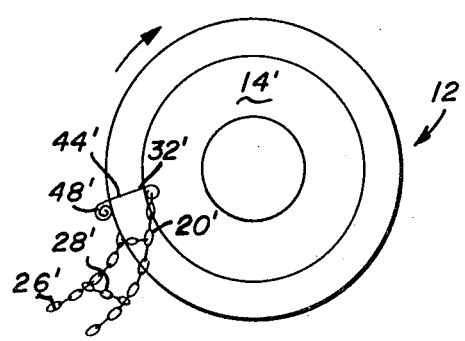
Fig_5A
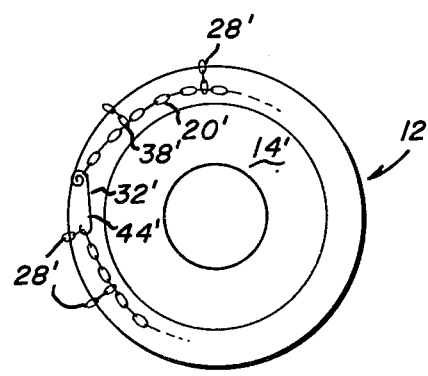
Fig_5B

TIRE TRACTION ENHANCING APPARATUS

BACKGROUND OF THE INVENTION

1. Field of the Invention

The present invention relates generally to traction improving devices and, more specifically, to devices for improving and enhancing the traction of vehicular tires.

2. Description of the Prior Art

Tires are used as the traction means between the great majority of vehicles and the road, ground or other surfaces to be traveled over. These tires are typically made of rubber or rubber-like material and are frequently filled with air to give them buoyancy and flexibility. Tires almost universally include traction ridges and crevices known as treads which extend circumferentially along the surface of the tire which contacts the surface over which travel is intended. These treads provide the main element of traction between the tire and the travel surface under normal conditions. However, there are conditions under which the treads are ineffective to provide sufficient traction between the tire and the surface. Especially in conditions when the surface is covered with ice and snow, the treads tend to become ineffective in maintaining efficient traction with the travel surface. Under such conditions the predominantly utilized method of improving traction is the use of chains.

Tire chains, or equivalent additions to the tire surface, increase traction by providing a deeper and more irregular road engaging surface on the tire. These chains dig deeper into the snow or ice, and, because of their irregular surface, provide better traction than would the typical, relatively smooth, surface of the tire treads. Although devices such as chains are not desirable under normal conditions since they provide for a rougher and less regular ride, their increased traction abilities make them invaluable under rough weather conditions.

Although most of the prior art chains and similar devices are effective in providing reasonable traction under snowy conditions, there have been several disadvantages which have accompanied the use of such devices. Foremost among these is the difficulty of installation on a tire. A typical prior art tire chain must be worked around the tire by hand and then fastened to itself both on the side of the tire nearest the axle and on the outer side of the tire. Both the process of working the chain around the entire tire, especially when a part of the tire is supporting the weight of the vehicle, and the necessity of working on the inside sidewall of the tire, that is the side surface of the tire which faces the axle, are difficult in the typical outdoor, inclement weather, conditions of installation. Since it is not at all infrequent for the installation of tire chains to take place in a snowstorm on a mountain road, it is desirable that the installation of such chains be as easy and as rapid as possible.

Another difficulty which frequently hampers the use of tire chains is the irregularity of the ride upon such chains. Typical prior art chains consist of a number of links of chain crossing the tread at various intervals along the circumference of the tire. Consequently, the ride on such tire will be bumpy in that when the weight carrying portion of the tire rests specifically on the chain the vehicle will be displaced further from the travel surface than in the intervals wherein the weight of the vehicle will rest on the tire surface itself.

Various attempts have been made in the prior art to solve these difficulties. With respect to the difficulty of installation, and in particular to the difficulty of placing the chain in position circumferentially around the tire, some of the more notable of the prior art devices are described in U.S. Pat. No. 2,608,234, issued to Hughes, U.S. Pat. No. 4,042,000, issued to Nyland, U.S. Pat. No. 4,093,012, issued to Detwiler, and U.S. Pat. No. 4,055,210, issued to Mongault. Each of these prior art references indicates a method by which the chains may be held in place by a device attached to the tire during installation such that the tire may be driven forward on the chain and the motion of the tire causes the chain to wrap around the tire to form a complete web.

The disadvantage of having to work with chains on the interior sidewall of the tire has led to the attempts disclosed in U.S. Pat. No. 1,672,019 issued to F. H. Barber, and U.S. Pat. No. 2,462,378 issued to Fox, to obtain solution. The Barber and Fox inventions relate to a manner in which the final connection can be made on the outside surface of the tire such that it is not necessary to do careful and fine work on the relatively inaccessible interior sidewall.

With respect to the disadvantage of rough and inconsistent ride caused by prior art chains, the most significant attempts to solve this problem known to the inventor are disclosed in U.S. Pat. No. 4,111,251, issued to Bula, and U.S. Pat. No. 3,955,610 issued to Freeman, the present inventor. These patents describe tire chains designed so as to evenly distribute the chains such that the chain support is approximately equal at all points during the tire's rotation.

None of the prior art attempts are entirely successful in solving all three of these problems. A disadvantage in the prior art attempts to create self-installing tire chains is that all utilize devices which have the further disadvantage of being frictionally held against the side of the tire. When the tire is then rotated under a load, as in use, the pressure and friction of the devices against the sidewall create pressure imbalances within the tire and abrasion to the portions of the sidewall contacting the devices. This is particularly true when such devices are used on radial tires wherein the shape of the sidewall varies significantly during the rotation of the tire depending on the weight being carried by that portion of the tire. Furthermore, the attempts to solve the difficulty of working with the interior surfaces of the tire when installing the links have not been satisfactorily solved in conjunction with the use of the self-installing device in that none have appeared in the prior art. Finally, none of the prior art attempts to create a smooth ride by providing a constant surface displacement have succeeded in providing both adequate traction for forward travel and an appropriately smooth ride.

SUMMARY OF THE PRESENT INVENTION

Accordingly, it is a primary object of the present invention to provide a tire traction apparatus which simplifies and optimizes the installation of the apparatus on a tire.

It is another object of the present invention to provide an apparatus which not only optimizes the installation upon the tire but further avoids abrasive or pressure contact against the sidewalls of the tire after installation has been completed.

It is also an object of the present invention to provide a tire traction apparatus which may be installed without the necessity of detailed efforts in the limited space on the relatively inaccessible interior sidewall of the tire.

It is a further object of the present invention to provide a tire traction apparatus which provides for a smooth ride upon the tire when the apparatus is installed by providing a relatively constant separation between the tire and the travel surface.

Briefly, the presently preferred embodiment of the present invention is a traction enhancing apparatus for vehicle tires consisting of four elongated chains arranged parallel to one another. The center two of such chains are of a length slightly less than the circumference of the tire. The elongated chain that is to engage the exterior sidewall is somewhat shorter than the center chains. The remaining chain, being the chain to be placed against the interior sidewall of the tire, is substantially the same length as the exterior chain, but also includes an extension length. A number of cross chains are included and arrayed perpendicularly to the circumferential chains and connecting equivalent lengths of each such chain to the adjacent chain or chains. The traction apparatus further includes a pair of identical bridles, attached respectively to the ends of each of said four chains. Each bridle is in the form of a piece of metal bent such that it fits snugly over the sidewall of the tire when placed along a radius of the tire but does not contact the narrower upper surface of the tire sidewall when arrayed perpendicularly to the radius of the tire, and further shaped such that the extension of the elongated interior sidewall chain fits through loops in the bridles so as to connect with a standard fastener to form a complete, firmly held, weblike ring about the tire.

It is an advantage of the present invention that the bridle mechanisms allow the chain to be easily and optimally installed while refraining from causing pressure or abrasive contact with the tire sidewall after installation is complete.

It is another advantage of the present invention that the circumferential chains arrayed along the treads provide an approximately constant thickness buffer between the tire and the travel surface and thus provide for a relatively smooth ride.

It is a further advantage of the present invention that it combines the advantages of easy installation, including having a single connecting point on the outside sidewall of the tire, with a smooth, comfortable ride.

These and other advantages of the present invention will become apparent upon reading the detailed description of the preferred embodiment which is illustrated in the several figures of the drawing.

IN THE DRAWING

FIG. 1 is a perspective view of a preferred embodiment of the tire traction enhancing apparatus of the present invention shown installed upon a vehicular tire;

FIG. 2 is a front view of an eyeglass link utilized in the preferred embodiment;

FIG. 3 is a perspective view of an installer bridle element of the preferred embodiment;

FIG. 4 is a top view of an alternate embodiment of the present invention showing the relationship between the exterior and interior circumferential chains, the bridle and the latching mechanism;

FIGS. 5a and 5b comprise a side view of a tire illustrating the easy installation feature of the alternate embodiment both in the installing mode, FIG. 5a, and in the completed and operational mode, FIG. 5b.

DETAILED DESCRIPTION OF THE PREFERRED EMBODIMENT

FIG. 1 is a perspective view of a tire traction enhancing apparatus of the present invention, referred to by the general reference character 10. The apparatus 10 is designed to form a relatively snug net about a vehicular tire 12 to provide an irregular contact surface between the tire 12 and a road or other travel surface such that the traction is increased, particularly in conditions of snow and ice.

A typical vehicular tire 12 is mounted on an axle of the vehicle such that it has an exterior side facing away from the center of the vehicle and the axle and an interior side facing the center portion of the vehicle and the axle. Thus the tire 12, as illustrated, includes an exterior sidewall 14, an interior sidewall 16 and a tread 18 which extends circumferentially around the surface of the tire.

The traction apparatus 10 consists of an exterior chain 20 designed to engage the exterior sidewall 14 of tire 12 when the apparatus is installed. A further element of the traction apparatus is an outside center chain 22 which extends circumferentially along the tread 18 of tire 12 when installed. Identical to outside center chain 22 and displaced across the tread toward the center of the vehicle is an inside center chain 24. Adapted so as to engage the interior sidewall 16 of tire 12 is an interior chain 26 (shown in phantom). Chains 20, 22, 24, and 26 are aligned parallel to one another such that each extends circumferentially around tire 12 when installed.

At various points along each of the chains 20, 22, 24, and 26 are arrayed a plurality of cross-link chains 28. Cross-links 28 connect equivalent points on chains 20, 22, 24, and 26 to the adjacent chain or chains such that when the apparatus 10 is installed on the tire 12, the cross-links 28 project substantially radially around the tread surface. The preferred type of chain used in constructing the center chains and the cross-links which engage the travel surface is a type which has twisted links to maximize the surface irregularity and improve the traction.

The center portion of the cross-links 28 connecting the center chains 22 and 24 includes a plurality of eyeglass links 30. Eyeglass links 30 are rigid such that they maintain a proper constant separation between the center chains 22 and 24.

Exterior chain 20 is of a shorter length than that of the center chains 22 and 24. This is so because the ends of exterior chain 20 engage the ends of a pair of identical installing bridles 32 and 34. Bridles 32 and 34 are generally "U-shaped" and attach to the exterior and interior chains 20 and 26 at the ends of the arms of the bridles. Center chains 22 and 24 are attached to the bit segments, the bottom of the "U", of installing bridles 32 and 34. One end of interior chain 26 is attached to the interior arm of bridle 32 whereas the opposing end of interior chain 26 engages the end of the interior arm of bridle 34 but extends a distance beyond such engagement point. A free length 37 of interior chain 26 extends through the loop eyes of bridles 32 and 34 in a diagonal pattern to connect with a latch 38 attached to the exterior arm of bridle 32. The manner in which free length 37 extends through the loop eyes of bridles 32 and 34 to attach to the latch 38 provides for a single latch point for connecting the entire apparatus 10 together. It is to be noted that latch 38 may attach to any link on the free length 37. This feature allows the person installing the traction apparatus 10 to adjust the tautness of the fit upon tire 12 by simply pulling the free length 37 tighter after it has been threaded through bridles 32 and 34 and attaching latch 38 to a link displaced inward from the end of free length 37.

The bit portions of bridles 32 and 34 extend across the surface of the tread 18. In order to provide a consistent thickness for the apparatus 10, the bit portions of bridles 32 and 34 are provided with a plurality of cylindrical tubes 40. The diameter of the tubes 40 is the same as the width "w" of the chain links of chains 22 and 24 and cross links 28 and 30. This consistent thickness provides for a smoother ride in the vehicle. The tubes 40 also provide for proper separation of center chains 22 and 24 at the points where they contact the bridles 32 and 34. Tubes 40 may be actual metal or plastic cylinders slidably mounted on the bridles or may be material wrapped on the bridle to achieve the proper thickness.

Referring now to FIG. 2, an eyeglass link 30 such as that used to connect center chains 22 and 24 in FIG. 1 is shown in a front plan view. Eyeglass link 30 is a single rigid cylindrical member with a center member 41 having opposing ends 42 and 43 bent so as to form eyes for attaching to chain links. Eyeglass links 30, when engaged to the center chains 22 and 24, provide rigid spacing elements which keep center chains 22 and 24 properly separated.

Referring now to FIG. 3, installer bridle 32 is further illustrated in a perspective view. Bridles 32 and 34 are identical in structure. Installer bridle 32 consists of a single cylindrical member such as a very heavy wire, which has been bent into a bridle shape, i.e., a shape similar to a block "U". Bridle 32 has a pair of parallel arms 42, 44 connected by a bit portion 45. About the ends of each arm, the wire is bent to form a pair of eyes 46 by which the bridle may be attached to the links of the interior sidewall chain 26 and exterior sidewall chain 20 or to which a latch may be attached. At points near the intersection of the arms and the bit 45, the wire is bent to form a pair of loop eyes 48. The loop eyes 48 are displaced downward slightly from the bit when the bridle is viewed as shown such that when the bit portion 45 extends across the tread 18 of the tire, as shown in FIG. 1, loop eyes 48 are displaced along the sidewall such that they do not come into contact with the road or ground. Such contact could cause the loop eyes to be deformed or worn. The loop eyes 48 have sufficient diameter that the links of chain utilized with the invention may readily slide through the loop eyes, that is, the loop eyes 48 have an inside diameter greater than the width of the links of free length 37.

FIG. 4 is a top plan view of an alternate embodiment of the present invention. Those elements common to the embodiment 10 of FIGS. 1–3 carry the same reference numerals distinguished by a prime designation. In the embodiment of FIG. 4, the center chains and one of the bridles are omitted. In FIG. 4, only the ends of the chains are illustrated in the manner in which they would abut when installed on a tire. FIG. 4 illustrates the application of installer bridle 32 to a conventional tire chain configuration.

In the embodiment of FIG. 4, one end of exterior chain 20' is attached to one of the eyes 46' located at the end of exterior arm 44' of bridle 32' while the conventional chain latch 38' is attached to the other end of exterior chain 20'. One end of interior chain 26' is attached likewise to the other eye 46' situated at the end of the interior arm 44' of the bridle 32' and the other end of interior chain 26' extends beyond the final set of cross links 28' a significant distance to form the free length 37'. To secure the apparatus of FIG. 4 on a tire, the free length 37' of chain 26' is passed through first the interior loop eye 48' then through exterior loop eye 48' of the bridle 32' and is finally connected to the latch 38. As in the embodiment 10, the traction apparatus of FIG. 4 may be tightened or loosened in its fit upon the tire 12 by the specific link of free length 37' which is attached to the latch 38'.

It is to be noted that in the embodiment of FIG. 4, there are no center chains to attach to the bit portion 45' of bridle 32'. Cross links 28' are continuous and do not include any eyeglass links since there is no need to space center circumferential chains. As in the embodiment 10, it is preferable for the cross links 28' to be of the twisted link type of chain to improve traction while chains 20' and 26' are conventional variety for easy and economical construction. It is valuable, despite the absence of center chains, to provide a tube 40' along the bit portion 45' of bridle 32' such that a thickness equivalent to that of cross links 28' is achieved and a smoother ride results.

It may also be seen that the embodiment of FIG. 4 may be achieved utilizing existing tire chains of the prior art by the addition of the bridle member 32' to one end of existing chains, the addition of extra links of chain to form a free length 37' on the interior chain 26' and the attachment of a standard latch 38' to exterior chain 20'. The simple addition of these few elements to existing chains can achieve the optimal installation and easy attachment characteristics of the present invention, even though this will not provide the smooth ride characteristics provided by the circumferential center chains of the preferred embodiment 10.

Referring now to FIGS. 5a and 5b, the operation of installer bridle 32' is shown. FIG. 5a illustrates the bridle 32' in the installation mode, and FIG. 5b illustrates it in the operational mode after the apparatus of FIG. 4 has been completely installed on the tire. It can be seen in FIG. 5a that during installation, the bridle 32' is arrayed such that arms 44' extend radially in toward the hub of the wheel while the bit portion extends across the tread of the tire. In this manner, arms 44' frictionally contact the sidewalls of the tire at the points, displaced from the tread, wherein the sidewalls reach their maximum separation, i.e., the point where the tire width is greatest, and that the bridle 32' is thereby held in place. With the installer bridle 32' firmly held in place on the tire, the tire is then rotated in such a manner that the bridle continues around the circle traversed by the rim of the tire and the traction apparatus of FIG. 4 is drawn around the tire so that a single rotation of the tire causes the apparatus to form an enclosing net. After the tire has been completely rotated one rotation, the far ends of the circumferential chains approach the point of contact with bridle 32'. At this point bridle 32' is still frictionally attached to the sidewalls. Bridle 32' is then rotated, as shown in FIG. 5b, such that arms 44' are arrayed so as to be nearly perpendicular to the radius of tire 12 and such that arms 44' are no longer in frictional contact with the wide portions of the sidewalls. At this point the net is completed and the apparatus is firmly affixed to the tire by threading the free length 37' of interior chain 26' through bridle 32' and affixing it to latch 38'.

It may be noted that the preferred and alternate embodiments are designed such that either may be effectively utilized on both right and left side tires on a given vehicle. To accomplish this the only required modification is one of procedure. During installation the bridle 32 is affixed such that the longer interior chain 26 is toward the interior or less accessible side of the tire. The tire is then rotated in the appropriate direction to bring the ends of the apparatus into the proper configuration for latching. This direction will be opposite for the two sides of the vehicle.

This dual purpose operation of bridle 32 is particularly valuable. The first advantage is that when arrayed as in FIG. 5a the bridle 32' provides a firm frictional attachment to the sidewalls of the tire such that the apparatus may be easily installed by simply driving the vehicle so as to rotate the tire to draw the circumferential chains around the tire. The second advantage occurs in the operational mode, illustrated in FIG. 5b, where the frictional and pressure contact between the arms of bridle 32 and the sidewalls of the tire is alleviated such that no significant abrasion or undue pressure is applied to the sidewall while the vehicle is in operation. At this point the apparatus is held in place by the completion of the net and no longer requires the pinch type contact of the bridle.

Thus the present invention eliminates the difficulty encountered in many prior art devices wherein the tires, particularly radial tires where the shape of the sidewall varies drastically depending on the load applied to that particular portion of the tire, was restricted in the prior art by the pressure and abrasion of the self-installation devices of the prior art. See, e.g., the confining devices of Hughes, U.S. Pat. No. 2,608,234 and Stellas, U.S. Pat. No. 3,618,653. This could cause wear to the sidewalls as well as fatigue damage to the tire caused by the inability of the sidewall to expand at the point wherein it was restricted by the self-installation device. Additionally, the retrofit devices of the prior art could be bent out of shape by the swelling of the sidewalls under the pressure of a directly applied load such that the retrofit or self-installation device would no longer fit snugly when it was next utilized.

The traction apparatus of the preferred embodiments is presently intended to be manufactured using commercially available metallic chain and metallic wire. However, no restriction is made as to the materials of construction thereof except to the extent that minimum strength and durability are required to withstand the abuse of usage and to support vehicles on irregular travel surfaces in bad weather.

Although the present invention has been described above in terms of the presently preferred embodiment, it is to be understood that such disclosure is not to be considered as limiting. Accordingly, it is intended that the appended claims be interpreted as covering all alterations and modifications which fall within the true spirit and scope of the invention.

What is claimed is:

1. In a tire traction enhancing apparatus including at least two circumferential chains connected at discrete points by perpendicular chains and extending about the surface of a vehicular tire, the improvement comprising:

a bridle member attached to one end of the outermost and innermost circumferential chains with respect to the tire, the bridle member being generally "U-shaped" and having equal length arms and a bit portion, the length of said bit portion being less than the sidewall-to-sidewall width of the inflated tire, and the length of said arms being less than the tread to rim depth of the inflated tire, the attachment to the outermost and innermost circumferential chains being made at the ends of said arms, and the bridle member having loop eyes for receiving chain at the intersections of said arms and said bit portion.

2. A tire traction enhancing device of claim 1 wherein,
the bridle member further includes loops formed at the exterior ends of said arms for mating with the ends of the circumferential chains.

3. A tire traction enhancing device of claim 1 wherein,
the bridle member is integrally formed of generally rigid material such that when oriented with said bit portion abutting the tread of the tire and said arms extending inward along a radius of the tire, said arms are firmly frictionally held against the sidewalls of the tire.

4. A tire traction enhancing device of claim 3 wherein;
the bridle member is adapted to be radially affixed to the tire while the circumferential chains are installed about the tire and is further adapted to rotate about said bit portion to an orientation wherein said arms extend tangentially to the tire and do not abut against the sidewalls when the device is fully installed.

5. A tire traction enhancing device including:
an exterior longitudinal chain for extending circumferentially along the exterior sidewall of the tire;
an interior longitudinal chain for extending circumferentially along the interior sidewall of the tire;
a plurality of traction members extending across the tread of the tire, at intervals, to connect corresponding points on the exterior and interior longitudinal chains;
a bridle affixed to one end of each of the longitudinal chains, the bridle being adapted to engage the exterior and interior sidewalls of said tire, the bridle being generally "U-shaped" having two arms connected by a bit portion and being of size such that the bridle fits snugly on the tire when placed such that the arms of the bridle extend inward along a radius of the tire toward the hub while the bit portion abuts against the treads and further formed such that said arms do not abut against the sidewalls of the tires when the bridle is oriented such that said arms extend longitudinally to the tire, the bridle further including means at the ends of said arms for affixing the bridle to the exterior and interior longitudinal chains and said bridle further being formed into loops for slidably receiving chain at points on said arms at the intersections with said bit portion; and
means for attaching the ends of said chains opposite the bridle to the bridle or to one another through the bridle so as to form the apparatus into a relatively snug circumferential net about said tire.

6. A tire chain apparatus as recited in claim 5 wherein:
said means for attaching comprises a free length extending on and beyond the end of the interior longitudinal chain which is not affixed to the bridle, said free length adapted for extending through and beyond said loops, and a latch attached to the free end of the exterior longitudinal chain for receiving said free length and attaching to a desired link of said free length to achieve the desired snugness of fit about the tire.

* * * * *